United States Patent [19]
Amberger

[11] Patent Number: 5,693,908
[45] Date of Patent: Dec. 2, 1997

[54] HOUSING WITH DEVICE FOR HOLDING CONNECTING CABLES

[75] Inventor: Reinhard Amberger, Stuttgart, Germany

[73] Assignee: Alcatel, N.V., Rijswijk, Netherlands

[21] Appl. No.: 558,813

[22] Filed: Nov. 15, 1995

[30] Foreign Application Priority Data

Nov. 19, 1994 [DE] Germany ............ 44 41 230.4

[51] Int. Cl.$^6$ .................................. H02G 3/10
[52] U.S. Cl. ............... 174/48; 174/52.1; 174/65 R; 174/DIG. 8; 361/825; 361/826
[58] Field of Search .................. 174/21 R, 48, 174/52.1, 60, 65 R, 74 A, 77 R, 135, 92, DIG. 8; 248/74.3, 226.12, 227.4; 361/825, 826; 439/719, 449

[56] References Cited

U.S. PATENT DOCUMENTS

| 4,495,680 | 1/1985 | Beck ................... 28/100 |
| 4,816,619 | 3/1989 | Heys, Jr. et al. .......... 174/135 |
| 5,347,090 | 9/1994 | Cerda .................. 174/DIG. 8 |
| 5,415,567 | 5/1995 | Fusselman et al. .......... 439/719 |

FOREIGN PATENT DOCUMENTS

| 39 30 781 | 3/1991 | Germany. |
| 40 08 840 | 8/1991 | Germany. |
| 92 00 154.8 | 4/1992 | Germany. |
| 41 33 372 | 4/1993 | Germany. |
| 84 17 683.0 | 9/1994 | Germany. |

OTHER PUBLICATIONS

IBM Technical Disclosure Bulletin, BD. 8, NR. 5, Nov. 1965, New York, U.S., p. 722, Foytlin "Right–Angle Strain Relief Clamp".

*Primary Examiner*—Kristine L. Kincaid
*Assistant Examiner*—Marc D. Machtinger
*Attorney, Agent, or Firm*—Frishauf, Holtz, Goodman, Langer & Chick

[57] ABSTRACT

A housing (1) which gently holds at least one pressure sensitive connecting cable (4) and provides strain relief for the at least one pressure sensitive connecting cable has a housing wall portion (2) which has an opening (3) through which the at least one connecting cable (4) can be passed into the housing (1). The housing (1) has a holding comb (22) therein, which include an angle member (5) having tangs or projections (7). The tangs or projections (7) are loosely fitted into additional openings (8) formed in the housing wall portion (2). The holding comb (22) also has tines (10) for respectively securing one of the connecting cables (4) using a heat shrinkable tube (11) to a respective one of the tines (10). The holding comb (22) is underlaid with an elastic cushion member (12) and the holding comb (22) with the connecting cables secured thereto is held, between the elastic cushion member (12) and another elastic cushion member (21) positioned in a cap (13), when the cap (13) is suspended, by two hooks (15) located on an end portion thereof, in corresponding further openings or slits (16) formed in the housing wall portion (2) and then the cap is fixed to the housing wall portion (2) by a tab portion (18) provided on an end portion (18) of the cap (13).

29 Claims, 2 Drawing Sheets

HOUSING WITH DEVICE FOR HOLDING CONNECTING CABLES

BACKGROUND OF THE INVENTION

1. Field of the Invention

The invention relates to a housing with a device for cushionably holding connecting cables in position and for providing strain relief, and to a method for connecting cables to such a housing with such a device. Housings with such devices are used especially in systems in electrical and optical telecommunications.

2. Description of the Prior Art

German Patent Disclosure DE 40 08 840 C1 discloses a housing with a distributor device for fiber optics, in which a device for strain-relieved holding of the connecting cables comprises a plurality of cable clamps located in the housing. Each cable clamp secures a respective one of the connecting cables inside the housing by pressing the respective one of the connecting cables into a corresponding hole of a carrier plate.

A housing providing cable clamp fastening for a connecting cable and also having fiber-optic lines passed into the housing through an opening is described in German Patent DE 41 33 372 C2. The fiber-optic lines terminate in plugs that are joined to couplings secured in the housing on a sheet-metal angle member. No separate strain-relief holding of the fiber-optic lines is provided.

German Patent DE 39 30 781 C2 discloses a telecommunications socket in which a covering arrangement comprises cover caps and plug inserts provided on an outside of the socket housing, which allow the lines to be extended parallel or obliquely with respect to a front side of the socket housing.

A housing with a device for strain-relieved holding of connecting cables is also known from German Utility Model DE 92 00 154 U1 which discloses that the housing has holding combs with tines which are formed by means of cut-outs stamped into a bottom plate as shown in FIG. 2 of this German Utility model, and the connecting cables are secured to these combs with commercially available cable connectors. However, the cable strain relief device disclosed in this Utility Model which is positioned inside the housing often takes up more housing volume than is actually available therein, if the housing has given dimensions. In fixing the connecting cables by means of cable connectors, the danger of cable constriction or cable damage also arises, which depending on cable type can cause functional problems with devices accommodated in the housing.

In the prior art, damage to a pressure sensitive connecting cable can result from use of conventional cable-fixing techniques such as using commercially available connectors.

SUMMARY OF THE INVENTION

It is an object of the invention to provide a device which is simple to mount on the outside of a housing for strain-relief holding of connecting cables, and which enables gentle, mechanically protected securing of pressure-sensitive connecting cables to the housing.

It is another object of the present invention to provide a method for gently holding connecting cables which are pressure damageable and for providing strain-relief for such connecting cables.

DETAILED DESCRIPTION

Figure 1:
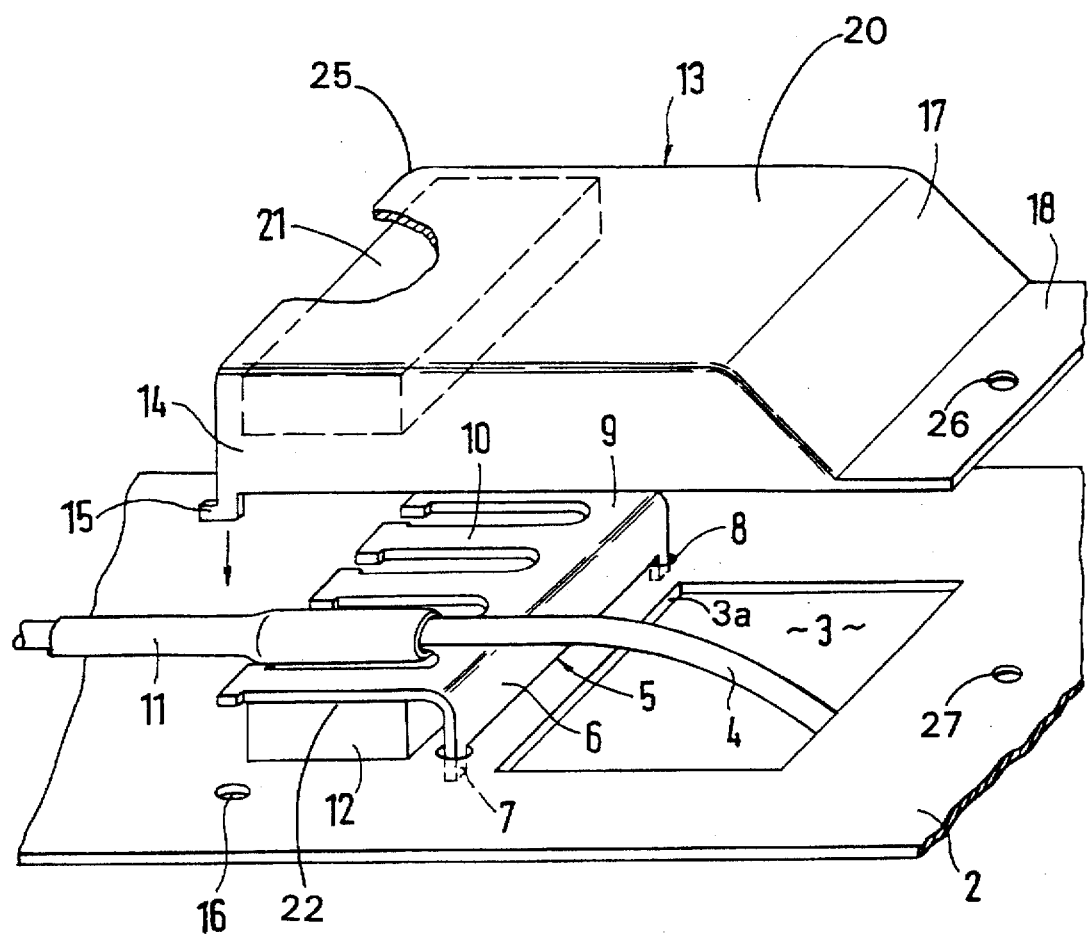
FIG. 1, is a perspective view of a detail of a housing with a connecting cable held in a strain-relieved manner, with the housing cap removed.
Figure 2:
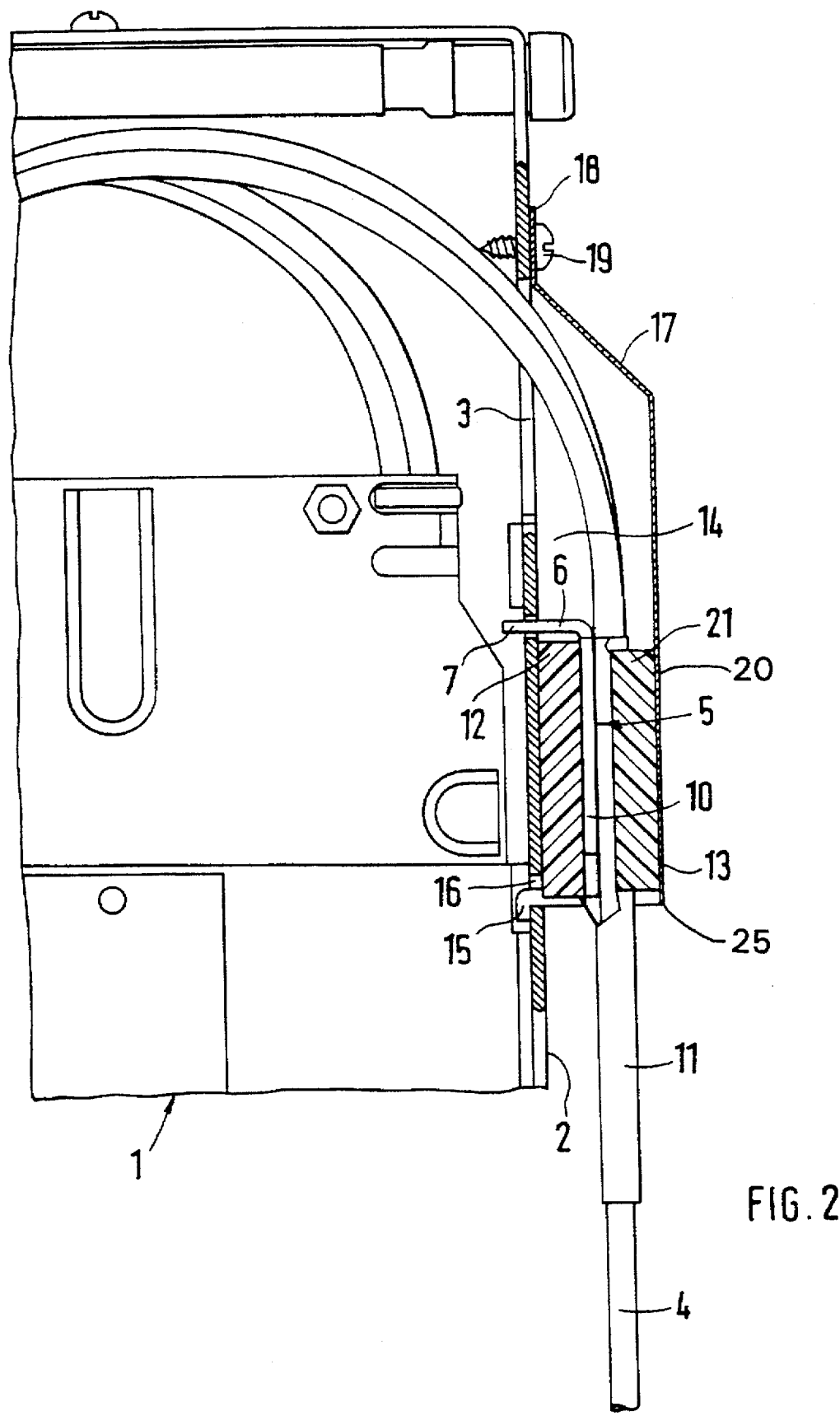
FIG. 2, is a fragmentary side sectional view of a detail of the housing with connecting cables held in a strain-relieved manner, with the housing cap secured on a housing wall portion.

As shown in FIGS. 1 and 2 of the drawings, the housing 1 of the invention has a housing wall portion 2. The housing wall portion 2 may be any arbitrary part of the housing 1, such as a side or back wall or a front panel of a frame-like housing of a plug-in module.

The exemplary embodiment of the housing wall portion 2 shown in FIGS. 1 and 2 has at least one rectangular opening 3 formed therein through which connecting cables 4 can be passed. Instead of a single large opening 3, however, a plurality of small, and if needed also round, openings may be provided in housing wall portion 2.

As shown in FIG. 1, a holding comb 22 is spaced apart a small distance away from and in parallel to a longitudinal edge 3a of the rectangular opening 3. The holding comb 22 comprises an angle member 5 of generally L-shaped cross section, which is preferably a stamped and bent part made from sheet metal. A shorter leg 6 of the angle member 5 has two tangs or projections 7 protruding from a lower end thereof, which tangs 7 fit into corresponding holes 8 formed in the housing wall portion 2 in such a way as to prevent relative rotation and/or movement of the angle member 5 relative to housing wall portion 2. The shorter leg 6 of the angle member 5 is mounted to be substantially perpendicular to the housing wall portion 2 and a longer leg 9 of the angle member 5 is spaced apart from and lies in a plane that is preferably parallel with the housing wall portion 2.

The longer leg 9 of the angle member 5 is divided into comb-like tines 10, which extend at right angles to the shorter leg 6 of the angle member 5. Each tine 10 preferably serves to secure thereto one connecting cable 4, passing through the opening 3 into the housing 1, by means of a shrinkable tube 11. Each tine 10 has a correspondingly suitable length for this, which is, for example, larger than a diameter of the connecting cable 4, or for example, a multiple of the diameter of the connecting cable 4. Each tine 10 also has a widened end portion 24 on a free end thereof. The widened end portion 24 is used to engage and fix the shrinkable tube 11 along with a respective one of the connecting cables 4 onto the respective tines 10 of the holding comb 22 in a slip-proof manner. As soon as the shrinkable tubing 11 containing a loose cable has been slipped over the respective tine 10, the cable 4 can no longer move freely radially. The cable is then fixed to a tine 10 by shrink-fitting the tubing 11, by, for example, heating the shrinkable tubing 11. The holding comb 22 may either have the necessary number of tines 10 for the number of cables 4 to be connected thereto, or it may be formed to include an additional number of spare unused tines 10 which are not used and/or which are kept in reserve, in order to reduce the number of parts to keep on hand.

The shrinkable tube fastening of the connecting cables 4 to the respective tines 10 has the advantage that the cables 8 are encompassed or held in place over their entire circumference in the region of the entire length of the tines 10, as seen in FIG. 1. This distributes the holding or fixing forces, thereby avoiding localized or concentrated holding forces which could otherwise damage a cable 4. The shrinkable tubes 11 may be formed of a plastic material which shrinks in diameter upon application of heat thereto. Constrictions of the connecting cable 4 are avoided since the shrinkable tube 11 shrinks substantially uniformly over its length, and as a result, this type of fastening is especially well suited for fiber-optic or microcoaxial cables and is also especially well suited for other pressure-sensitive connecting cables 4 which could be damaged by concentrated or localized holding forces applied thereto. The shrinkable tubes 11 used are longer than the tines 10, often twice as long, and as a result, the protruding ends of the tubes 11 provide good protection against kinking of the connecting cables 4 in the vicinity of the free ends of the tines 10.

The connecting cables 4, during assembly, are preferably first secured to the tines 10 of the holding comb 22, by means of the shrinkable tubing 11, and the holding comb 22 is then inserted, together with the thus secured connecting cables 4, loosely into the openings 8 formed in the housing wall portion 2. Beforehand, an elastic cushion member 12 is preferably arranged under the longer leg 9 of the angle member 5. The elastic cushion member 12, for example, is formed of a foamed plastic or some other suitable cushion material, which provides gentle support for the connecting cables 4 and is secured, for example with a pressure-sensitive adhesive, to the housing wall portion 2. The cushion member 12 is also preferably secured to an underside of longer leg 9 of the holding comb 22 by means of an adhesive.

As shown in FIGS. 1 and 2, the angle member 5 and the housing wall opening 3 are preferably covered with a cap 13, for example made integrally from sheet metal as a stamped and bent part. The cap 13 is hollow and is largely open at the bottom end thereof. A first end portion 25 of the cap 13 that is open on a cable entry side thereof, has a hook 15 formed on a lower end portion of each of the side walls 14, and with these hooks 15 the cap 13 is mounted first in corresponding openings or slits 16 formed in the housing wall portion 2 during assembly, and is then tilted to a closed position (counterclockwise in FIG. 2) so that the tab 18, provided at a closed cap end portion 17, rests flat on the housing wall portion 2 and is secured detachably to the housing wall portion 2, for example with a screw 19 as shown in FIG. 2, which can be a sheet metal screw, which passes through hole 26 in tab 18 and is threadably engaged in an opening 27 of housing wall portion 2.

If the top surface 20 of the cap 13 is flat, the holding comb 22 will be held between the elastic cushion member 12 and the flat cap top 20 along with the shrinkable tubes 11 mounted to the tines 10 to hold the connecting cables 4 in place. This arrangement improves the structural integrity of the apparatus and improves securing of the cables 4 in the housing during assembly without damaging the connecting cable 4.

It is preferred to form the cap 13 with high side walls 14 and to provide an inside of a rear end portion of the cap top 20 with another elastic cushion member 21 which is similar to the elastic cushion member 12, so that the holding comb 22 with the connecting cables 4 secured thereto is held gently between the two elastic cushion members 12 and 21 (see FIG. 2). The elastic cushion member 21, which by way of example is secured to an inside of cap top 20 with adhesive such as a pressure sensitive adhesive, makes it possible to compensate for major allowable production tolerances of the connecting cables 4 and other parts of the housing, and also makes it possible to secure connecting cables 4 which may have different diameters.

The elastic cushion members 12 and 21 can be made extremely economically from yard goods, such as sheets of elastic cushion material, which are obtainable in the open market. The yard goods are typically sold in bolts or sheets, from which the required lengths or sizes are merely cut off.

The method for providing a housing having a device for gently holding connecting cables which are damageable by pressure and for providing strain-relief for the connecting cables includes the steps of providing a housing wall portion 2 which has at least one opening formed therein and passing at least one connecting cable through the at least one opening into the housing, loosely mounting a holding comb 22 on the housing wall portion 2 by inserting tangs 7 provided on the holding comb 22 into openings 8 formed in the housing wall portion 2; fixing connecting cables 4 to respective ones of a plurality of tines 10 of the holding comb 22 by means of a shrinkable tubing 11; securing a cap 13 having hooks 15 formed thereon to openings or slits 16 formed in the housing wall portion 2 to cover at least the holding comb 22 and the opening 3 formed in the housing wall portion 2; gently holding the respective connecting cables mounted on the respective ones of the tines 10 between an elastic cushion member 12 mounted between the tines 10 of the holding comb 22 and the housing wall portion 2 and another elastic cushion member 21 positioned in the cap to be opposite to the elastic cushion member 12 when the cap 13 is mounted to the housing wall portion 2; and fixing the cap 13 to the housing wall portion 2 so that each connecting cable is cushioned from damage by the elastic cushion members 12 and 21 while the connecting cables are also provided with strain-relief.

Various changes and modifications may be made in connection with the embodiment shown and described, within the scope of the inventive concept.

What is claimed is:

1. A housing for holding at least one connecting cable in position and for providing strain relief for the at least one connecting cable without damaging the at least one connecting cable, the housing (1) comprising:

a housing wall portion (2) having at least one opening (3) therein through which the at least one connecting cable (4) is passable into said housing (1);

a holding comb (22) having at least one tine (10), said at least one connecting cable (4) being fixable to said at least one tine (10);

said holding comb (22) comprising a connecting member (7) which is mountable to a connecting member (8) of the housing wall portion (2);

a cap (13) attachable to the housing wall portion (2);

a shrinkable tubing (11) surrounding a portion of a length of said at least one connecting cable (4) and said shrinkable tubing (11) being mountable over said at least one tine (10) before shrinking of said shrinkable tubing (11), for mounting said at least one connecting cable (4) to said at least one tine (10);

said at least one tine (10) having a length which is greater than a diameter of said at least one connecting cable, for enabling said at least one connecting cable (4) to be mounted on said at least one tine (10) without damaging said at least one connecting cable (4).

2. The housing as claimed in claim 1, further comprising an elastic cushion member (12) provided between said at least one tine (10) of said holding comb (22) and the housing wall portion (2) of said housing.

3. The housing as claimed in claim 2, further comprising another elastic cushion member (21) provided between said at least one tine (10) and said cap (13) for gently pressing on said at least one tine (10) of the holding comb (22) when the cap is mounted on the housing wall portion (2).

4. The housing as claimed in claim 1, further comprising an elastic cushion member (21) provided between said at least one tine (10) and said cap (13) for gently pressing on said at least one tine (10) of the holding comb (22) when the cap is mounted on the housing wall portion (2).

5. The housing as claimed in claim 1, wherein said holding comb (22) includes an angle member (5) which has a generally L-shaped cross section with two legs (6, 9) of unequal length, a shorter one (6) of the two legs extending in a first plane that is substantially perpendicular to the housing wall portion (2) and a longer one (9) of the two legs extending in a second plane that is substantially parallel to and spaced apart from the housing wall portion (2).

6. The housing as claimed in claim 5, wherein:
said connecting member (7) of said holding comb (22) comprises projections or tangs (7);
the shorter leg (6) of said angle member (5) includes said projections or tangs (7) formed at a lower end portion thereof; and
said connecting member (8) of the housing wall portion (2) comprises additional openings (8) formed in the housing wall portion (2) and into which respective ones of said projections or tangs (7) are received to loosely mount said holding comb (22) to the housing wall portion (2).

7. The housing as claimed in claim 6, wherein the longer leg (9) of said angle member (5) includes said at least one tine (10), said at least one tine (10) extending in said second plane so as to be substantially perpendicular to the shorter leg (6) of said angle member (5).

8. The housing as claimed in claim 5, wherein the longer leg (9) of said angle member (5) includes said at least one tine (10), said at least one tine (10) extending in said second plane so as to be substantially perpendicular to the shorter leg (6) of said angle member (5).

9. The housing as claimed in claim 1, wherein said shrinkable tubing (11) has a length greater than the length of said at least one tine.

10. The housing as claimed in claim 1, wherein:
the cap (13) has a cable entry side that is open and has two hooks (15) formed thereon on the cable entry side thereof, the two hooks (15) being engageable with corresponding further openings or slits (16) formed in the housing wall portion (2), during assembly of the housing (1); and
the cap (13) is fixable to the housing wall portion (2) via a hole (26) in a connecting portion (18) thereof, the cap (13) covering the holding comb (22) and the at least one opening (3) when the cap (13) is assembled to the housing wall portion (2).

11. The housing as claimed in claim 10, comprising a screw (19) which passes through said hole (26) and fastens the connecting portion (18) of the cap (13) to the housing wall portion (2).

12. The housing as claimed in claim 10, wherein said holding comb (22) and the cap (13) are respectively stamped and bent sheet-metal parts.

13. The housing as claimed in claim 2, wherein the elastic cushion member comprises a foamed plastic material.

14. The housing as claimed in claim 5, wherein the angle member (5) and the cap (13) are respectively stamped and bent sheet-metal parts.

15. The housing as claimed in claim 3, wherein the elastic cushion member and the another elastic cushion member (12) each comprise a foamed plastic material.

16. The housing as claimed in claim 1, wherein said shrinkable tubing (11) comprises a heat shrinkable tubing.

17. The housing as claimed in claim 1, wherein the length of said at least one tine (10) is a multiple of a diameter of said at least one connecting cable (4).

18. The housing as claimed in claim 16, wherein said shrinkable tubing (11) has a length greater than the length of said at least one tine (10).

19. The housing as claimed in claim 3, wherein:
the cap (13) has a cable entry side that is open and has two hooks (15) formed thereon on the cable entry side thereof, the two hooks (15) being engageable with corresponding further openings or slits (16) formed in the housing wall portion (2) during assembly of the housing (1); and
the cap (13) is fixable to the housing wall portion (2) via a hole (26) in a connecting portion (18) thereof, the cap (13) covering the holding comb (22) and the at least one opening (3) when the cap (13) is assembled to the housing wall portion (2); and
whereby the at least one connecting cable (4) is gently held between said elastic cushion member (12) and said another elastic cushion member (21), when the holding comb (22) is mounted to the housing wall portion (2) and the cap (13) is assembled to the housing wall portion (2).

20. A method for holding and providing strain relief for at least one pressure sensitive connecting cable without damaging the pressure sensitive connecting cable, comprising the steps of:
providing a housing (1) having a housing wall portion (2) which has at least one opening (3) formed therein through which the at least one connecting cable (4) is passable into said housing;
loosely mounting a holding comb (22) on the housing wall portion (2) of said housing (1);
fixing the at least one connecting cable (4) to a respective one of a plurality of tines (10) included in the holding comb (22) with a shrinkable tubing (11);
coupling a cap (13) to the housing wall portion (2) to cover at least the holding comb (22) and the at least one opening (3) formed in the housing wall portion (2);
gently holding the at least one connecting cable (4) mounted on the respective one of the tines (10) between an elastic cushion member (12) provided between the respective one of the tines (10) of the holding comb (22) and the housing wall portion (2) and another elastic cushion member (21) provided between the respective one of the tines (10) of the holding comb (22) and the cap (13) when the cap (13) is coupled to the housing wall portion (2); and
fixing the cap to the housing wall portion (2) whereby the at least one connecting cable (4) is cushioned from damage by the elastic cushion member (12) and the another elastic cushion member (21) while also providing strain relief for the at least one connecting cable (4).

21. The method according to claim 20, further comprising providing the respective one of the plurality of tines (10) with a length greater than a diameter of the at least one connecting cable (4) to be mounted on the respective one of the plurality of tines, thereby preventing damage to the at least one connecting cable (4).

22. The method according to claim 21, wherein the length of the respective one of the plurality of tines (10) is a multiple of a diameter of the at least one connecting cable (4).

23. The method according to claim 20, further comprising forming an angle member (5) included in the holding comb

(22) to have a substantially L-shaped cross section having two legs (6, 9) of unequal length, a shorter one (6) of the two legs extending in a plane that is substantially perpendicular to the housing wall portion (2) and the longer one (9) of the two legs extending in another plane that is substantially parallel to and spaced apart from the housing wall portion (2).

24. The method according to claim 23, wherein the forming step comprises providing tangs or projections (7) formed on a lower end portion of the angle member, the tangs or projections (7) being loosely insertable into additional openings (8) formed in the housing wall portion (2).

25. The method according to claim 23, wherein the forming step comprises providing the longer leg (a) of the angle member (5) to include the plurality of tines (10) which extend in the another plane that is perpendicular to the shorter leg (6) of the angle member (5).

26. The method according to claim 20, wherein the cap (13) is fastened to the housing wall portion (2) via a hole (26) formed in a connecting portion (18) thereof.

27. The method according to claim 20, wherein the elastic cushion member (12) and the another elastic cushion member (21) each comprise a foamed plastic material.

28. The method according to claim 20, wherein the shrinkable tubing (11) comprises a heat shrinkable tubing, and wherein said fixing step comprises shrinking the heat shrinkable tubing by applying heat thereto.

29. The method according to claim 22, further comprising providing the shrinkable tubing (11) with a length that is greater than a length of the respective one of the plurality of tines (10).

* * * * *